Patented Jan. 26, 1937

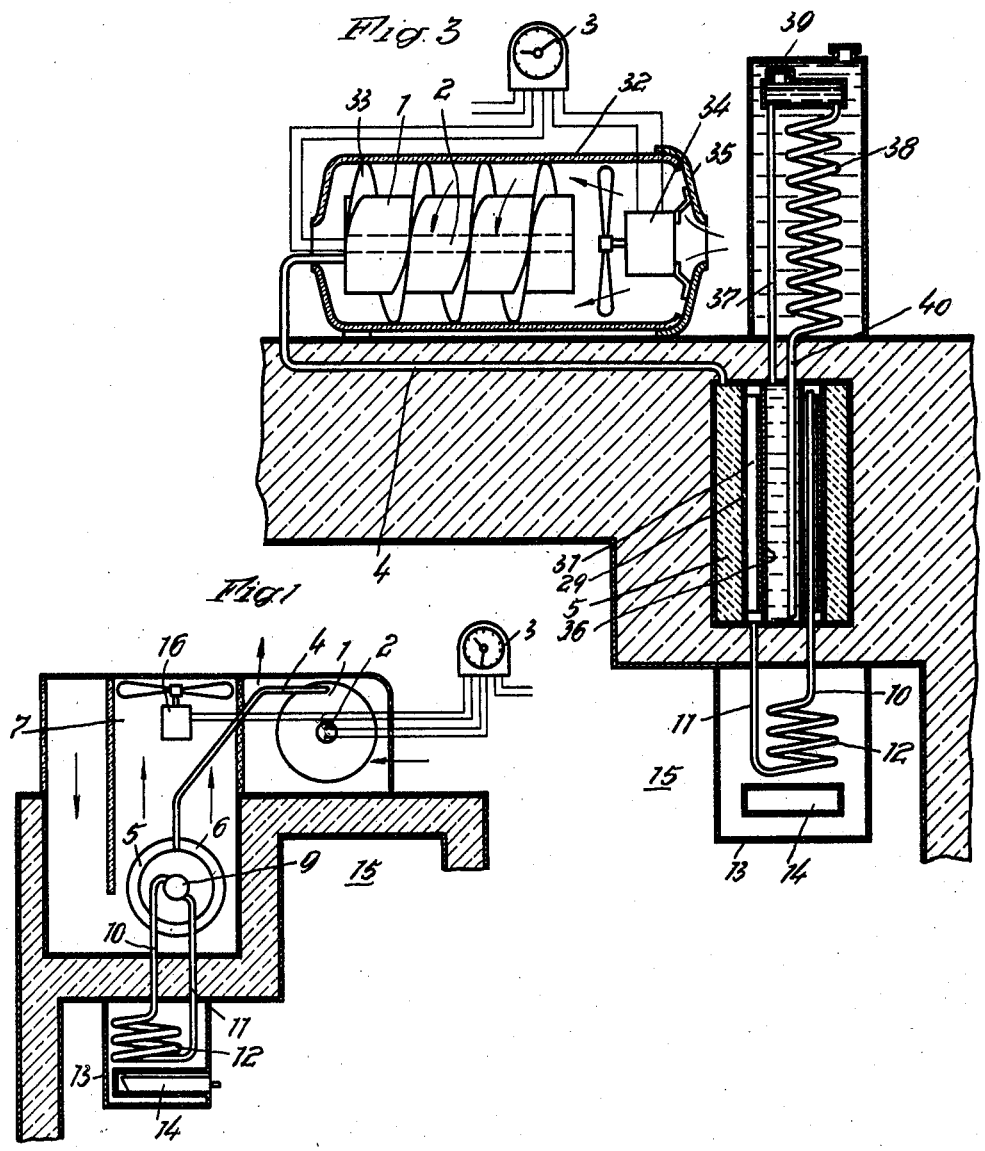

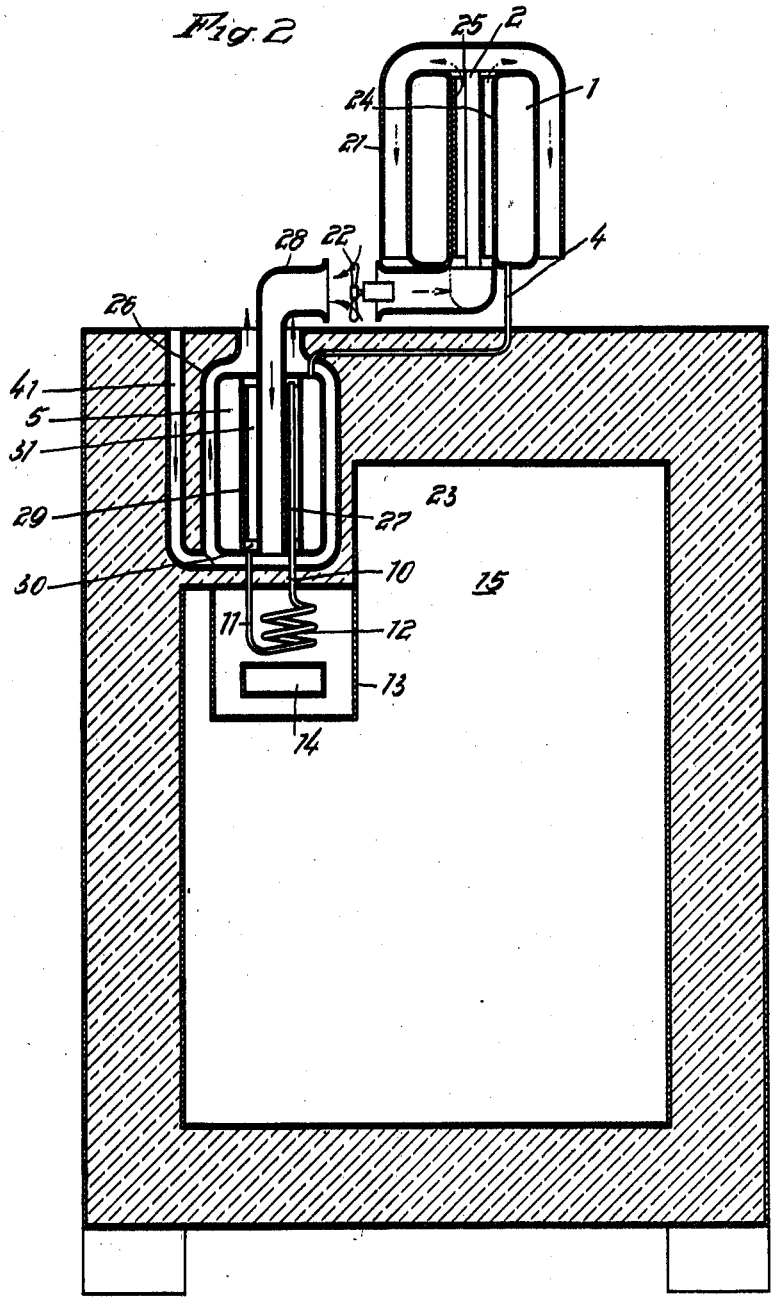

2,068,891

UNITED STATES PATENT OFFICE 2,068,891

AIR-COOLED REABSORPTION REFRIGERATING APPARATUS OF THE INTERMITTENT TYPE

Paul Scholl, Berlin-Siemensstadt, Germany, assignor to Siemens-Schuckertwerke Aktiengeseilschaft, Berlin-Siemensstadt, Germany, a corporation of Germany Application September 19, 1933, Serial No. 690,133
In Germany May 12, 1932

2 Claims. (Cl. 62—120)

My invention relates to air-cooled reabsorption refrigerating apparatus of the intermittent type.

Absorption refrigerating apparatus of the intermittent type referred to is that in which the refrigerant absorbed by a solid substance is driven off by the application of heat; whereupon it is brought into contact with another solid absorbent and absorbed by the latter and is subsequently separated again from the second substance by cooling the first substance, thereby causing a production of refrigeration that is well known. As absorbents various solid substances have been already proposed for such reabsorption apparatus. The recent development in the construction of refrigerating apparatus constantly aims at providing an apparatus which does not require any particular cooling medium (circulating cooling water), but which is only cooled by the air surrounding the apparatus.

The object of the present invention is to provide compounds of substances which have such properties as to be suitable for the operation of air-cooled reabsorption apparatus.

With this end in view, such a binary compound is selected for the operation of the reabsorption apparatus that in the pressure range corresponding to the production of refrigeration the temperature of absorption of the first solid substance contained in the generator-absorber upon taking up the refrigerant differs by 40° C. from the temperature of decomposition of the second solid substance contained in the reabsorber-evaporator. With solid substances which fulfil the above condition an apparatus may be designed in which the temperature of absorption is so high that the heat of absorption may be easily dissipated to the outside atmosphere and in which the reabsorption may be also effected at such a high temperature as to also easily dissipate the heat of reabsorption to the atmosphere.

By the use of ammonia as refrigerant, strontium-bromide in the generator-absorber and barium-chloride in the reabsorber-evaporator or copper-chloride in the generator-absorber and barium-chloride in the reabsorber-evaporator are, for instance, particularly suitable as absorbents for the purpose under consideration. Instead of ammonia, amines as refrigerants may be also employed together with these substances.

In the accompanying drawings forming part of the specification are represented some embodiments of my invention, similar numerals of reference indicating corresponding parts, and in which Fig. 1 shows diagrammatically an air-cooled reabsorption refrigerating apparatus associated with a domestic refrigerator;

Fig. 2 shows diagrammatically a modification of my invention in which both the generator-absorber and the reabsorber-evaporator are cooled by a ventilator;

Fig. 3 shows a diagrammatical view of another modified form of the invention in which the reabsorber-evaporator is cooled by a circulating liquid;

Figure 4:
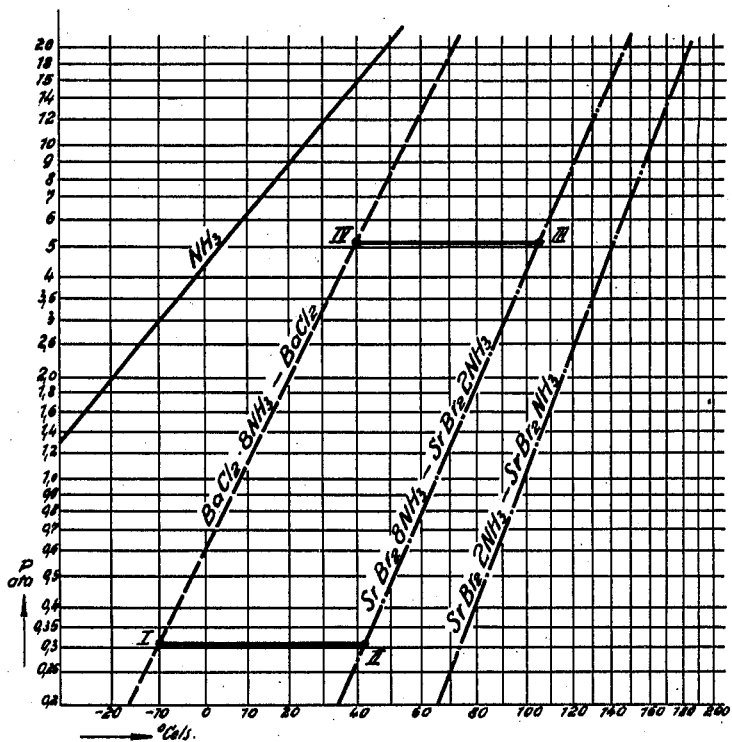
Fig. 4 shows a diagram illustrating the refrigerating cycle according to the invention.

Before describing the different embodiments of my invention it might first be convenient to explain the refrigerating cycle according to the present invention by reference to the vapor pressure diagram illustrated in Fig. 4. In Fig. 4 the vapor pressures of pure ammonia and the vapor pressure of the ammoniated barium-chloride and strontium-bromide are plotted against temperature. As will be seen from the diagram two pressure curves are characteristic for the combinations of ammonia with strontium-bromide, i. e., the curve which includes the combinations $SrBr_2 8NH_3$ to $SrBr_2 2NH_3$ and a second curve which includes the combinations $SrBr_2 2NH_3$ to $SrBr_2 NH_3$.

The refrigerating cycle is investigated on the assumption that the decomposition of the chemical compound during the generation be only continued up to the point of saturation corresponding to the formula $SrBr_2 2NH_3$. Consequently, in the present case a reabsorption apparatus of the intermittent type is assumed in which a compound of ammonia and strontium-bromide is contained in the generator-absorber and a compound of ammonia and barium-chloride in the reabsorber-evaporator. From the characteristic points I–IV plotted in the diagram of Fig. 4 it will be apparent that theoretically the temperature of $-10°$ C. may be obtained in the reabsorber-evaporator during the period for the production of refrigeration, since the ammonia is expelled from the barium-chloride at a pressure corresponding to this temperature and is absorbed by the strontium-bromide contained in the generator-absorber. Point II is characteristic for the absorption. It will be seen that the temperature of absorption lies at about 43° C. The heat of absorption may be, consequently, dissipated easily to outside atmosphere on hot summer days. The decomposition of the ammonia-strontium-bromide-compound during the generating period takes place theoretically in the point III at a generating temperature of about 103° C. The ammonia driven off is reabsorbed by the barium-chloride contained in the reabsorber-evaporator at the same pressure corresponding to point IV. Also the heat liberated in this case may be easily dissipated to the outside atmosphere, since the reabsorption is effected at this pressure at a temperature of about 40° C.

In order to improve the efficiency of the refrigerating apparatus it is of particular advantage if the binary compound is chosen in such a manner that, on the one hand, the difference between the generating temperature and the reabsorption temperature is at least as great as the difference between the temperature of absorption and that of evaporation, on the other hand. The greater the first-named difference as compared to the second-named the more favorable is the efficiency of the refrigerating apparatus. In the case of the above-proposed substances the ratio of the differences in temperature is, for instance, considerably more favorable than in the case of pure ammonia and of one of the solid substances hitherto proposed.

Referring now to Fig. 1 the generator-absorber 1 which is, for instance, filled with strontium-bromide saturated with ammonia is mounted on the refrigerator cabinet. Inside the generator an electric heating element 2 is arranged which is connected during the generating period to a supply circuit through a contact making clock 3. As a result of the heating of the generator the refrigerant is expelled from the absorbent and passes through the conduit 4 into the container 5 which is likewise filled with a solid absorbent; for instance, with barium-chloride. Here the refrigerant is reabsorbed by the barium-chloride, and the heat of reabsorption resulting therefrom will be dissipated to outside atmosphere by means of the cooling ribs 6 arranged around the reabsorber-evaporator 5. The reabsorber-evaporator 5 is arranged as disclosed in Fig. 1 in the lower part of the U-shaped air shaft 7 so that during the period of reabsorption the circulation of air as indicated by the arrows is possible which dissipates the waste heat, so as to normally cause a natural current of air in the channel 7. This circulation of air may be supported, if desired, by a ventilator 16 which may be arranged at the upper part of the shaft 7.

At the end of the generating period the heating current is cut off by the contact making clock 3 and the refrigerant absorbed in the reabsorber-evaporator 5 evaporates again after the generator-absorber is cooled down and flows into the generator-absorber through the conduit 4. During this cycle the heat of evaporation is abstracted from the cooling chamber 15 by means of an indirect heat transfer system. The indirect heat transfer is provided with a conduit 9 which runs through the reabsorber-evaporator 5, the circulation conduits 10 and 11 being connected to the conduit 9 and to the evaporator coil 12 located in the cooling chamber 15. In the closed heat transfer system 9, 10, 11, 12 liquid is contained having a low boiling point which automatically circulates as a result of the alternate evaporation in the evaporator coil 12 and condensation in the tube 9. The evaporator coil 12 is disposed in a storage vessel 13 in which a container 14 for artificial ice cubes may be placed. The heat of absorption liberated during the cooling period is dissipated from the generator-absorber walls directly to the surrounding air which comes into contact with the generator-absorber 1 as will be apparent from Fig. 1.

Fig. 2 also discloses a reabsorption apparatus arranged in a domestic refrigerator. In this embodiment the generator-absorber 1 is surrounded in such a manner by a heat-insulated hood 21 open at the lower end thereof that the air flowing upwardly as a result of the heating along the heat radiating walls of the generator-absorber 1 is accumulated in the hood 21 so that no natural circulation of air can be set up. This arrangement has above all the advantage that the losses of the apparatus during the heating period are considerably reduced as compared with an arrangement in which the generator-absorber during the heating period is subjected to the same cooling conditions as during the absorption period. The dissipation of heat of absorption is effected in this case with the aid of an artificial current of air caused by a ventilator, the current of air being forced during the absorption period in the direction of the arrows through an air passage into the inner tube 24 of the generator-absorber. The tube 24 has a corrugated wall 25 serving to transfer the heat, and which is, on the one hand, in heat exchange with the heating tube 2 and, on the other hand, with the inner tube 24. The cooling air passes along the outer walls of the generator-absorber 1 and flows downwardly to the lower part of the hood 21 to the outside atmosphere. The outer walls of the reabsorber 5 are surrounded by an air jacket which is defined by the jacket 26. The jacket 26 encloses a container which is open only at the upper end thereof so that the air cooled by the reabsorber 5 during the cooling period accumulates therein. An air conduit 27 to the upper end of which a supply channel 28 is connected passes through the reabsorber 5. This air conduit is in open communication with the air jacket 26 surrounding the reabsorber 5. The heat of absorption is dissipated in this embodiment by an artificial circulation of air in the passages 28, 27 and 26 produced by the ventilator 22. The ventilator 22 must be driven in this case by a reversible motor so that the ventilator causes a current of air during the generating period in the left-hand direction and, consequently, dissipates the heat of reabsorption to outside atmosphere and during the absorption period a current of air in the right-hand direction and dissipates the heat of absorption in the above-described manner. The driving motor for the ventilator is reversed in accordance with the contact-making clock (not shown) which at the same time energizes the heating element 2 of the generator-absorber in the generating period and deenergizes the same in the absorption period. Instead of employing a reversible motor a motor may be employed for driving the ventilator in one and the same direction. A rotation of the fan motor by 180 degrees may be effected, for instance, by a reversing gear so that the ventilator may cause a flow of current in either direction.

It is, of course, also possible to provide a particular ventilator for the generator-absorber 1 and for the reabsorber-evaporator 5.

For the transfer of the cooling effect from the reabsorber-evaporator 5 to the cooling chamber 15 an indirect transfer system might be employed similar to the embodiment shown in Fig. 1 consisting of the annular space 30 surrounded by the inner tube 29 of the reabsorber-evaporator and the air channel 27 and of the circulation conduits 10 and 11 connected therewith in any suitable manner. In order to support the transfer of heat corrugated heat conducting walls 31 are arranged in the annular space 30. In this closed circulating system a liquid having a low boiling point is contained which automatically circulates as a result of the evaporation in the evaporator coil 12 and of the condensation in the annular space 30.

Fig. 3 discloses as in the case of Fig. 2 a generator-absorber arrangement in which a natural circulation of air is prevented. The horizontally arranged generator-absorber 1 is placed in this embodiment in a heat-insulated container 32. Between the inner wall of the container 32 and the outer wall of the generator-absorber 1 a spirally wound guide sheet iron 33 is arranged which defines a cooling air channel spirally wound around the generator-absorber. The cooling air is forced by the ventilator 34 in the direction of the arrows through this channel. The ventilator is located inside the container 32 secured to the cover 35 thereof by means of bolts. The transfer of the cooling effect from the reabsorber-evaporator to the refrigerating chamber corresponds in this embodiment to the arrangement as shown in Fig. 2, however, except that other means are employed for transferring the heat of absorption to the outside atmosphere. In this case an indirect transfer system is employed for this purpose in which a medium remaining in a liquid state circulates during the transfer of heat. The transfer system consists of the inner tube 36 passing through the reabsorber-evaporator 5. At the upper part of the tube 36 is connected a circulation conduit 37 which leads to the cooler 38, which is arranged in a tank 39 filled with water. To the lower end of the cooler a circulation conduit 40 is connected which leads back to the lowest point of the tube 36. The liquid contained in this system circulates owing to thermosyphon action and transfers the heat of reabsorption to the water contained in the tank 39. Also in this case a corrugated heat radiating wall 31 is arranged between the inner tube 29 of the reabsorber-evaporator and the tube 36 so that the heat of absorption may be properly transferred from the solid substance contained in the reabsorber-evaporator 5 to the liquid contained in the tube 36 and that, on the other hand, the heat of evaporation necessary for the evaporation of the operating medium in the reabsorber may be properly transferred to the solid substance by the indirect transfer system 11, 12, 10.

My invention may be embodied in other forms than that shown and described and I, therefore, intend to cover by the appended claims all changes and modifications apparent to those skilled in the art and within the scope of my invention.

I claim as my invention:

1. In an air-cooled reabsorption refrigerating apparatus of the intermittent type designed to supply refrigeration to a cooling chamber comprising a generator-absorber with a solid absorbent and a reabsorber-evaporator with a second solid absorbent, means for conveying the refrigerant from the generator-absorber to the reabsorber-evaporator and vice versa, means for heating the generator-absorber during the heating period and means for cooling the same during the cooling period, means for supplying cooling air to the reabsorber-evaporator during the heating period, and means for transferring heat from the cooling chamber to the reabsorber-evaporator during the cooling period, said generator-absorber being arranged so as to permit during the heating period an accumulation of air in contact with the heat-radiating surfaces thereof, said generator-absorber cooling means comprising a ventilator so arranged as to supply a current of air to the heat-radiating surfaces of the generator-absorber during the cooling period, the reabsorber-evaporator being so arranged as to permit an accumulation of air during the cooling period, said reabsorber-evaporator cooling means comprising a ventilator so arranged as to supply a current of air to the heat-radiating surfaces of the reabsorber-evaporator during the heating period.

2. In an air-cooled reabsorption refrigerating apparatus of the intermittent type designed to supply refrigeration to a cooling chamber, a generator-absorber containing a solid absorbent, a reabsorber-evaporator containing a second solid absorbent, both absorbents being so chosen that within the range of pressure corresponding to the production of refrigeration the temperature of absorption of the first solid absorbent contained in the generator-absorber upon taking up the refrigerant differs by 40° C. from the temperature of decomposition of the second solid absorbent contained in the reabsorber-evaporator, means for conveying the refrigerant from the generator-absorber to the reabsorber-evaporator and vice versa, means for heating the generator-absorber during the heating period, means for transferring heat from the cooling chamber to the reabsorber-evaporator during the cooling period, and a ventilator so arranged as to supply a current of air to the heat radiating surfaces of the generator-absorber during the cooling period and to the heat radiating surfaces of the reabsorber-evaporator during the heating period.

PAUL SCHOLL.